United States Patent
Cleeton et al.

(10) Patent No.: US 10,068,092 B2
(45) Date of Patent: Sep. 4, 2018

(54) UPGRADING A SECURE BOOT POLICY ON A VIRTUAL MACHINE

(71) Applicant: Microsoft Technology Licensing, LLC, Redmond, WA (US)

(72) Inventors: Lawrence Ralph Cleeton, Sammamish, WA (US); Yevgeniy A. Samsonov, Redmond, WA (US); Kinshumann Kinshumann, Redmond, WA (US); Jingbo Wu, Medina, WA (US); Kevin Michael Broas, Kirkland, WA (US); Samartha Chandrashekar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 14/825,116

(22) Filed: Aug. 12, 2015

(65) Prior Publication Data

US 2016/0210457 A1    Jul. 21, 2016

Related U.S. Application Data

(60) Provisional application No. 62/106,187, filed on Jan. 21, 2015.

(51) Int. Cl.
*G06F 21/57* (2013.01)
*G06F 21/60* (2013.01)
*G06F 9/4401* (2018.01)

(52) U.S. Cl.
CPC .......... *G06F 21/575* (2013.01); *G06F 9/4406* (2013.01); *G06F 21/60* (2013.01)

(58) Field of Classification Search
CPC ....... G06F 21/575; G06F 21/60; G06F 9/4406

USPC ............................................................ 726/1
See application file for complete search history.

(56) References Cited

U.S. PATENT DOCUMENTS

| 7,707,629 | B2 | 4/2010 | Grawrock |
| 8,032,942 | B2 | 10/2011 | Smith et al. |
| 8,321,931 | B2 | 11/2012 | Zimmer et al. |
| 8,566,574 | B2 | 10/2013 | Shriver |

(Continued)

FOREIGN PATENT DOCUMENTS

| CN | 102202046 B | 10/2012 |
| WO | 2015003310 A1 | 1/2015 |

OTHER PUBLICATIONS

"Second Written Opinion Issued in PCT Application No. PCT/US2016/012782," dated Nov. 4, 2016, 8 Pages.

(Continued)

*Primary Examiner* — Dao Q Ho
*Assistant Examiner* — Angela R Holmes
(74) *Attorney, Agent, or Firm* — Klarquist Sparkman, LLP

(57) ABSTRACT

A facility for booting a virtual machine hosted on a host is described. In one example facility, the facility boots the virtual machine in accordance with a policy instance associated with the virtual machine. As part of the booting, the facility extracts information needed to complete the booting from a virtual trusted platform module associated with the virtual machine, the extraction based upon the policy instance associated with the virtual machine. At the completion of the booting, the facility copies contents of a policy instance associated with the host into the policy instance associated with the virtual machine.

15 Claims, 9 Drawing Sheets

(56) References Cited

U.S. PATENT DOCUMENTS

| | | | |
|---|---|---|---|
| 8,745,614 | B2 | 6/2014 | Banerjee et al. |
| 8,856,504 | B2 | 10/2014 | Maino et al. |
| 8,856,544 | B2 | 10/2014 | Bosch et al. |
| 2008/0126779 | A1 | 5/2008 | Smith |
| 2009/0133097 | A1 | 5/2009 | Smith et al. |
| 2011/0202916 | A1 | 8/2011 | VoBa et al. |
| 2012/0216242 | A1* | 8/2012 | Uner ............... G06F 21/51 726/1 |
| 2014/0007087 | A1 | 1/2014 | Scott-Nash et al. |
| 2014/0025961 | A1 | 1/2014 | Mackintosh et al. |
| 2014/0026124 | A1 | 1/2014 | Gilbert et al. |
| 2014/0047428 | A1 | 2/2014 | Prakash et al. |
| 2014/0130124 | A1 | 5/2014 | Ekberg |

OTHER PUBLICATIONS

"International Preliminary Report on Patentability Issued in PCT Application No. PCT/US2016/012782," dated Feb. 17, 2017, 7 Pages.

Howard, John, "Hyper-V Generation 2 Virtual Machines—Part 6," Published on: Nov. 1, 2013, Available at: http://blogs.technet.com/b/jhoward/archive/2013/11/01/hyper-v-generation-2-virtual-machines-part-6.aspx.

"BitLocker Tpm and Recovery Password tests for AOAC devices with PCR 7," Published on: May 22, 2013, Available at: https://msdn.microsoft.com/en-us/library/windows/hardware/jj124224.aspx.

International Search Report and Written Opinion Issued in PCT Application No. PCT/US2016/012782, dated Mar. 31, 2016, 12 Pages.

Toegl, et al., "acTvSM: A Dynamic Virtualization Platform for Enforcement of Application Integrity", In Proceedings of the Trusted Systems, vol. 6802 of the series Lecture Notes in Computer Science, Jan. 1, 2011, pp. 326-345.

"Bosboot Command", Retrieved from <<https://www.ualberta.ca/dept/chemeng/AIX-43/share/man/info/C/a_doc_lib/cmds/aixcmds1/bosboot.htm>, Jun. 17, 2013, pp. 1-5.

\* cited by examiner

UPGRADING A SECURE BOOT POLICY ON A VIRTUAL MACHINE

CROSS-REFERENCE TO RELATED APPLICATION(S)

This application claims the benefit of U.S. Provisional Application No. 62/106,187, filed on Jan. 21, 2015, which is hereby incorporated by reference in its entirety. In cases in which a document incorporated by reference herein is inconsistent with contents of this application, the contents of this application control.

BACKGROUND

Trusted Platform Module (TPM) technology is designed to provide hardware-based, security-related functions. TPMs can be used to perform system integrity measurements. In particular, during the boot process of a computer system, the TPM can measure and record the boot code that is loaded (including firmware and the operating system components). These integrity measurements can be used as evidence for how a system started, and to make sure that a TPM-based key can be used only when the correct software was used to boot the system.

Some full disk encryption solutions, such as the BITLOCKER encryption system included in MICROSOFT WINDOWS, leverage the TPM and a Secure Boot process to determine whether the system has been disrupted to an extent that suggests that the system has been compromised. When the encryption system learns from the Trusted Platform Module that such a situation exists, the key needed by the encryption system to decrypt the disk cannot be retrieved from the TPM. Without being able to decrypt the disk, booting cannot be completed, and the encryption system enters a recovery mode that can only be exited with an extra measure of authentication, such as entering a recovery password.

In some cases, the Secure Boot process uses a Secure Boot policy that specifies, for example, which versions of which operation systems are permissible to boot; which signing keys or certificates qualify a driver or other unit of code to be loaded during the boot process; etc. Some operating systems include a mechanism for automatically updating a computer system's Secure Boot policy, such as to add new versions of a permissible operating system, or remove an authorized signing key.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for booting a virtual machine hosted on a host is described. In one example facility, the facility boots the virtual machine in accordance with a policy instance associated with the virtual machine. As part of the booting, the facility extracts information needed to complete the booting from a virtual trusted platform module associated with the virtual machine, the extraction based upon the policy instance associated with the virtual machine. At the completion of the booting, the facility copies contents of a policy instance associated with the host into the policy instance associated with the virtual machine.

DETAILED DESCRIPTION

Figure 1:
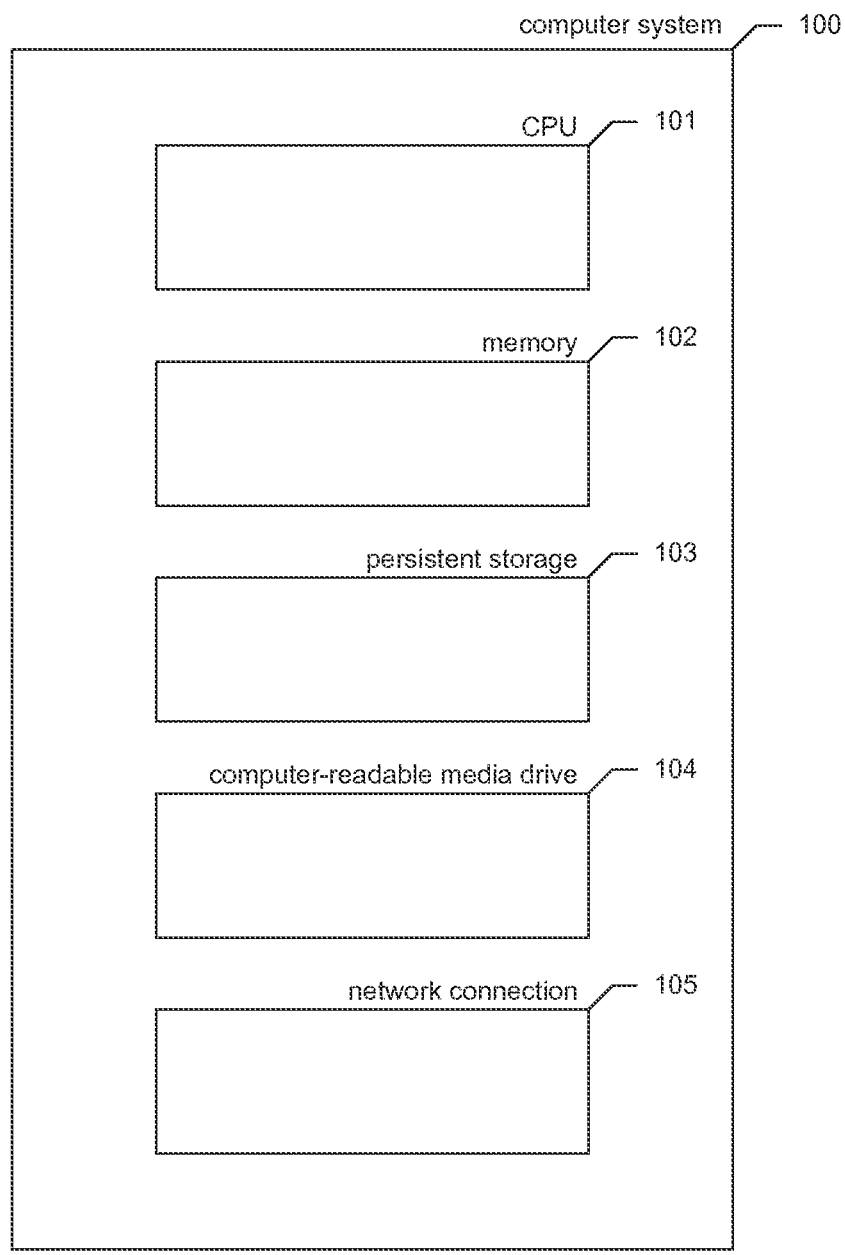
FIG. 1 is a block diagram showing some of the components that may be incorporated in at least some of the computer systems and other devices on which the facility operates.

The inventors have recognized that performing upgrades on a virtual machine having a virtual Trusted Platform Module ("vTPM") and a recovery mode protected and TPM-dependent full disk encryption solution (such as MICROSOFT BITLOCKER) may trip the virtual machine into a recovery state. The transition into a recovery mode happens because the upgrade operation in many ways resembles an attack on Secure Boot which provides the infrastructure to secure the boot process by preventing the loading of drivers or OS loaders that are not signed with an acceptable digital signature. When secure boot is enabled, an inconsistency in PCR 7 measurements between the computed value and the measured value trips a virtual machine into recovery. Secure Boot policy changes which are deployed as operating system updates can affect PCR 7 measurements and potentially trip a vm into recovery. Such trips into a recovery mode represent a significant problem in cloud infrastructures because of high costs associated with virtual machine downtime and troubleshooting.

In order to address this problem, the inventors have invented and reduced to practice a software facility for upgrading a secure boot policy on a virtual machine in a way that does not unnecessarily trigger a disk encryption recover state ("the facility").

The facility maintains a secure boot policy for the virtualization host in a host secure boot policy store. The host's security policy is immediately updated in response to each secure boot policy update received by the host. Each of the virtual machines established on the host has its own local secure boot policy store containing the secure boot policy used by the virtual machine. The state of this local secure boot policy of the virtual machine affects both (1) how booting of the virtual machine is performed by the secure boot system, and (2) whether the virtual machine enters recovery state during booting.

The facility carefully controls the state of the local secure boot policy of each virtual machine to reduce the likelihood that the virtual machine will enter the recovery state. In particular, the facility maintains the state of a virtual machine's local secure boot policy unchanged between the time that the local secure boot policy is used to seal in the virtual machine's vTPM the encryption key used to encrypt the disk, and the time during booting the virtual machine when this encryption key is successfully recovered from the virtual machine's vTPM on the basis that the local secure boot policy is unchanged. Once the encryption key is recovered and recovery state is avoided, the facility checks whether the secure boot policy in the host secure boot policy store has been updated, and, if so, copies the updated secure boot policy to the vm's local secure boot policy store. In this situation, the facility also reseals the encryption key in the virtual machine's vTPM based upon the updated secure boot policy now stored in the vm's local secure boot policy store. When the vm is subsequently rebooted, extraction of the encryption key from the vTPM will again succeed, based upon the key having been sealed using the updated secure boot policy that is now in the vm's local secure boot policy store, and the recovery state will again be avoided.

By providing a local copy of the secure boot policy for each virtual machine in addition to the virtual TPM associated with it, the facility can upgrade the secure boot policy without tripping any vm into recovery state.

FIG. 1 is a block diagram showing some of the components that may be incorporated in at least some of the computer systems and other devices on which the facility operates. In various examples, these computer systems and other devices 100 can include server computer systems, desktop computer systems, laptop computer systems, tablet computer systems, netbooks, mobile phones, personal digital assistants, televisions, cameras, automobile computers, electronic media players, electronic kiosk devices, electronic table devices, electronic whiteboard devices, etc. In various examples, the computer systems and devices may include any number of the following: a central processing unit ("CPU") 101 for executing computer programs; a computer memory 102 for storing programs and data while they are being used, including the facility and associated data, an operating system including a kernel and device drivers, and one or more applications; a persistent storage device 103, such as a hard drive or flash drive for persistently storing programs and data; a computer-readable media drive 104, such as a floppy, CD-ROM, or DVD drive, for reading programs and data stored on a computer-readable medium; and/or a communications subsystem 105 for connecting the computer system to other computer systems and/or other devices to send and/or receive data, such as via the Internet or another wired or wireless network and its networking hardware, such as switches, routers, repeaters, electrical cables and optical fibers, light emitters and receivers, radio transmitters and receivers, and the like.

Figure 2:
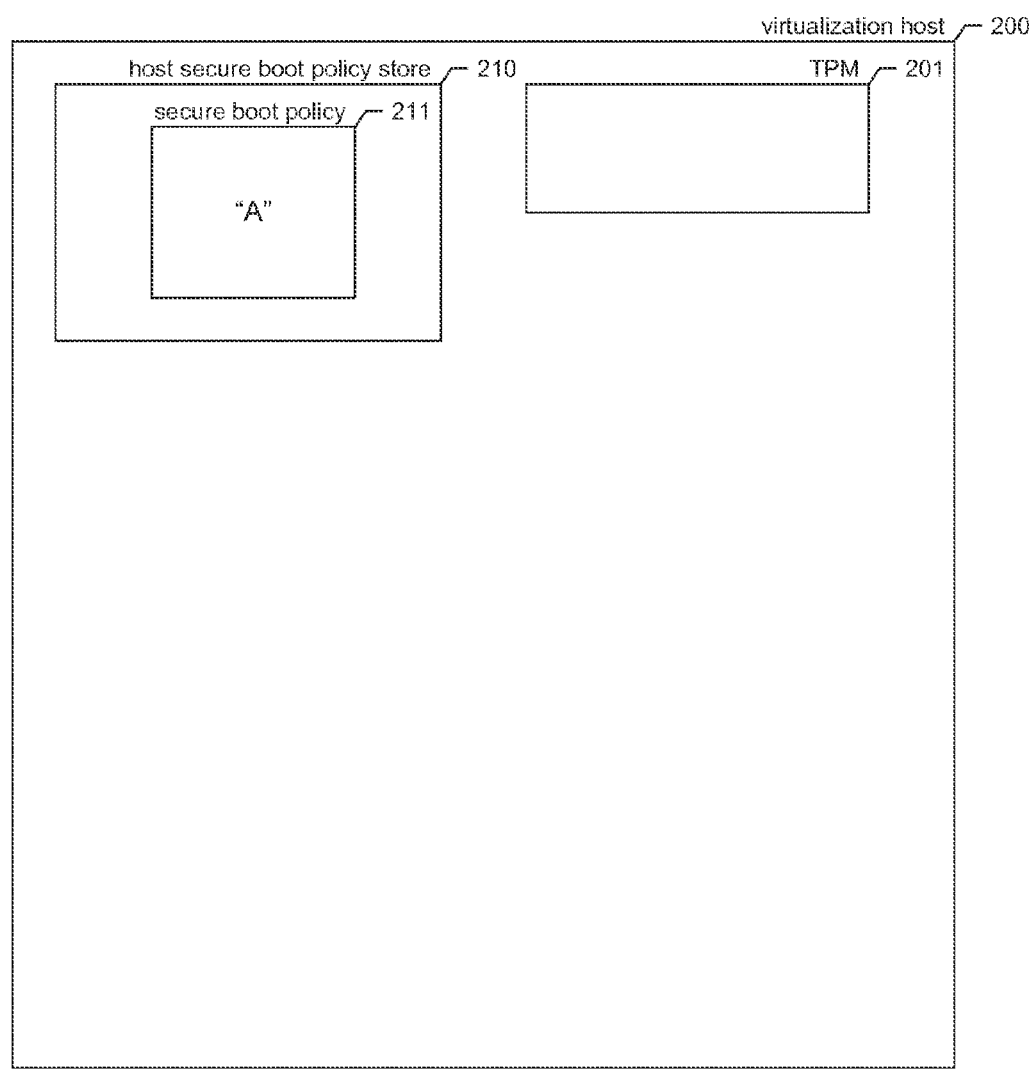
FIG. 2 is a block diagram showing a first state of a virtualization host computer system on which the facility operates.

FIG. 2 is a block diagram showing a first state of a virtualization host computer system on which the facility operates. In some examples, the virtualization host is a physical computer system having physical components such as a processor, memory, network interface card, etc. The virtualization host 200 includes a physical TPM 201. The virtualization host also includes a host secure boot policy store 210, which stores a secure boot policy 211 for immediate use by the operating system executing on the virtualization host, and for eventual use by the operating systems operating on virtual machines executing on the virtualization host. The letter "A" in the secure boot policy indicates an initial version of the secure boot policy, in which, for example, certain operating system versions are permitted to boot, drivers and other software that have been signed with keys or certificates on an approved list are permitted to be loaded as part of the booting process, etc.

Figure 3:
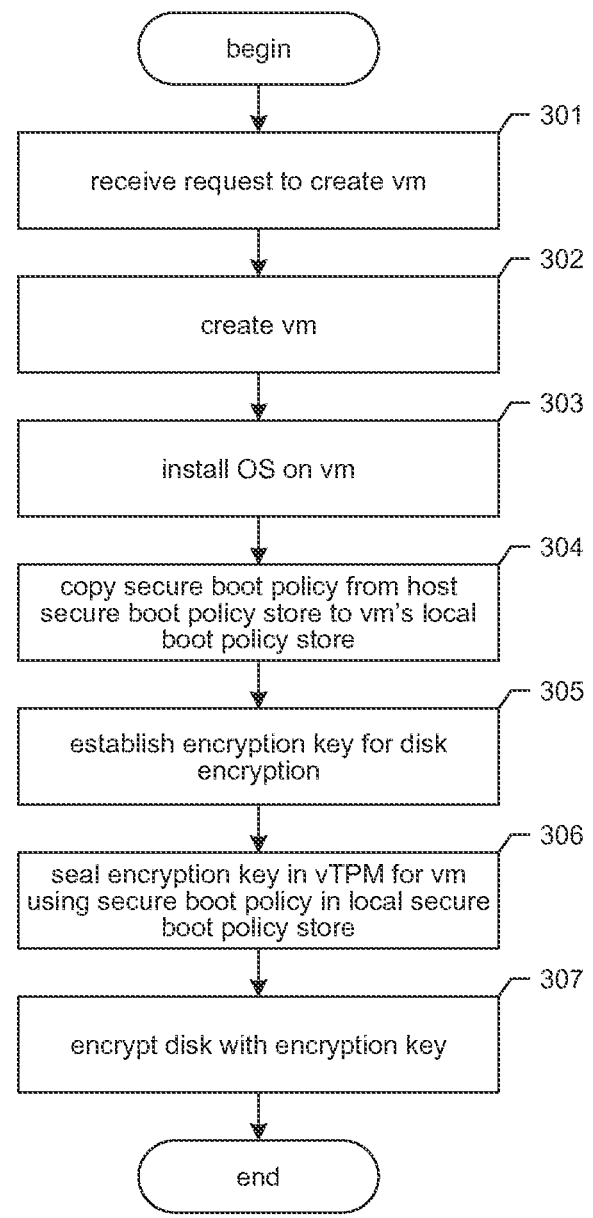
FIG. 3 is a flow diagram showing example acts that may be performed by the facility in some examples to create a virtual machine for execution on the virtualization host.

FIG. 3 is a flow diagram showing example acts that may be performed by the facility in some examples to create a virtual machine for execution on the virtualization host. At 301, the facility receives a request to create a virtual machine. In some examples, the request is received from a customer of a cloud-based hosting service to create a new virtual machine for the customer's use. At 302, the facility creates the requested virtual machine.

Figure 4:
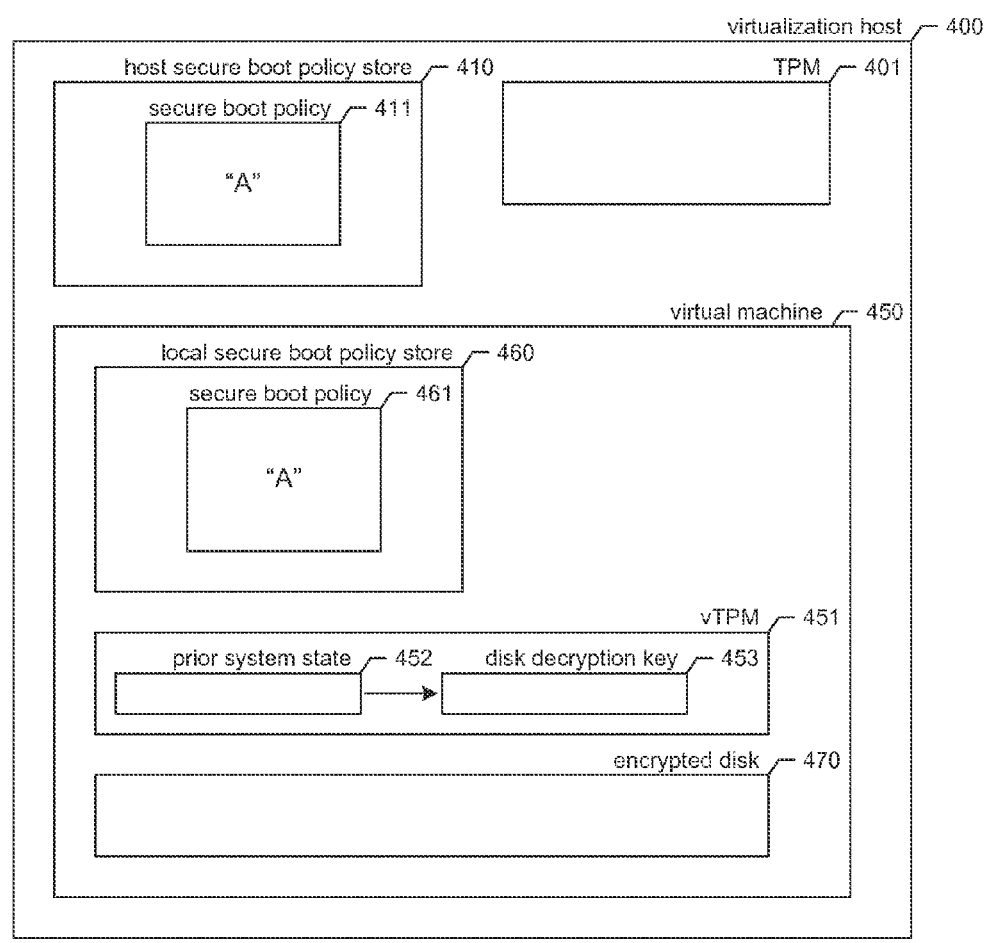
FIG. 4 is a block diagram showing the virtualization host in a second state at a time following performance of the acts shown in FIG. 3.

FIG. 4 is a block diagram showing the virtualization host in a second state at a time following performance of the acts shown in FIG. 3. It can be seen that the facility has created virtual machine 450 in the virtualization host 400.

Returning to FIG. 3, at 303, the facility installs an operating system on the virtual machine created at 302. At 304, the facility copies the secure boot policy from the host secure boot policy store to a local boot policy store of the virtual machine. Returning to FIG. 4, it can be seen that the facility has copied secure boot policy 411 from host secure boot policy store 410 to local secure boot policy store 460 as secure boot policy 461. By the appearance of the letter "A" in secure boot policy 461 in local secure boot policy store 460, it can be seen that it is the same as secure boot policy 411 in host secure boot policy store 410.

Returning to FIG. 3, at 305, the facility establishes an encryption key for encrypting an encrypted disk in the virtual machine. At 306, the facility seals the encryption key established at 305 in a vTPM established for the virtual machine, based both on a present system state (stored in the vTPM as the "prior system state") and the secure boot policy in the local secure boot policy store.

Returning to FIG. 4, it can be seen that the vTPM 451 contains the disk decryption key 453, sealed based both upon the secure boot policy 461 stored in local secure boot policy store 460 and prior system state 452, also stored in the vTPM.

Returning to FIG. 3, at 307, the facility encrypts a disk for the virtual machine using the encryption key established at 505. These acts then conclude.

Returning to FIG. 4, it can be seen that the facility has encrypted the encrypted disk 470 with the encryption key. During the present execution session of the virtual machine, the decryption key will be available, either from a vTPM or cached in volatile memory, to decrypt the encrypted disk as needed. Upon rebooting of the virtual machine, the contents of the encrypted disk will be unavailable in unencrypted form until the key can be recovered from the vTPM.

Figure 5:
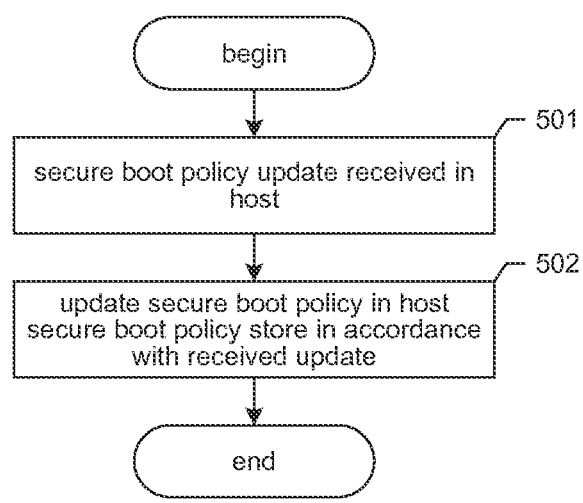
FIG. 5 is a flow diagram showing example acts that may be performed by the facility in some embodiments to process an update to secure boot policies received in the virtualization host.

FIG. 5 is a flow diagram showing example acts that may be performed by the facility in some embodiments to process an update to secure boot policies received in the virtualization host. At 501, the facility receives a secure boot policy update in the virtualization host. At 502, the facility updates the secure boor policy stored in the host secure boot policy store in accordance with the update received at 501. These acts then conclude.

Figure 6:
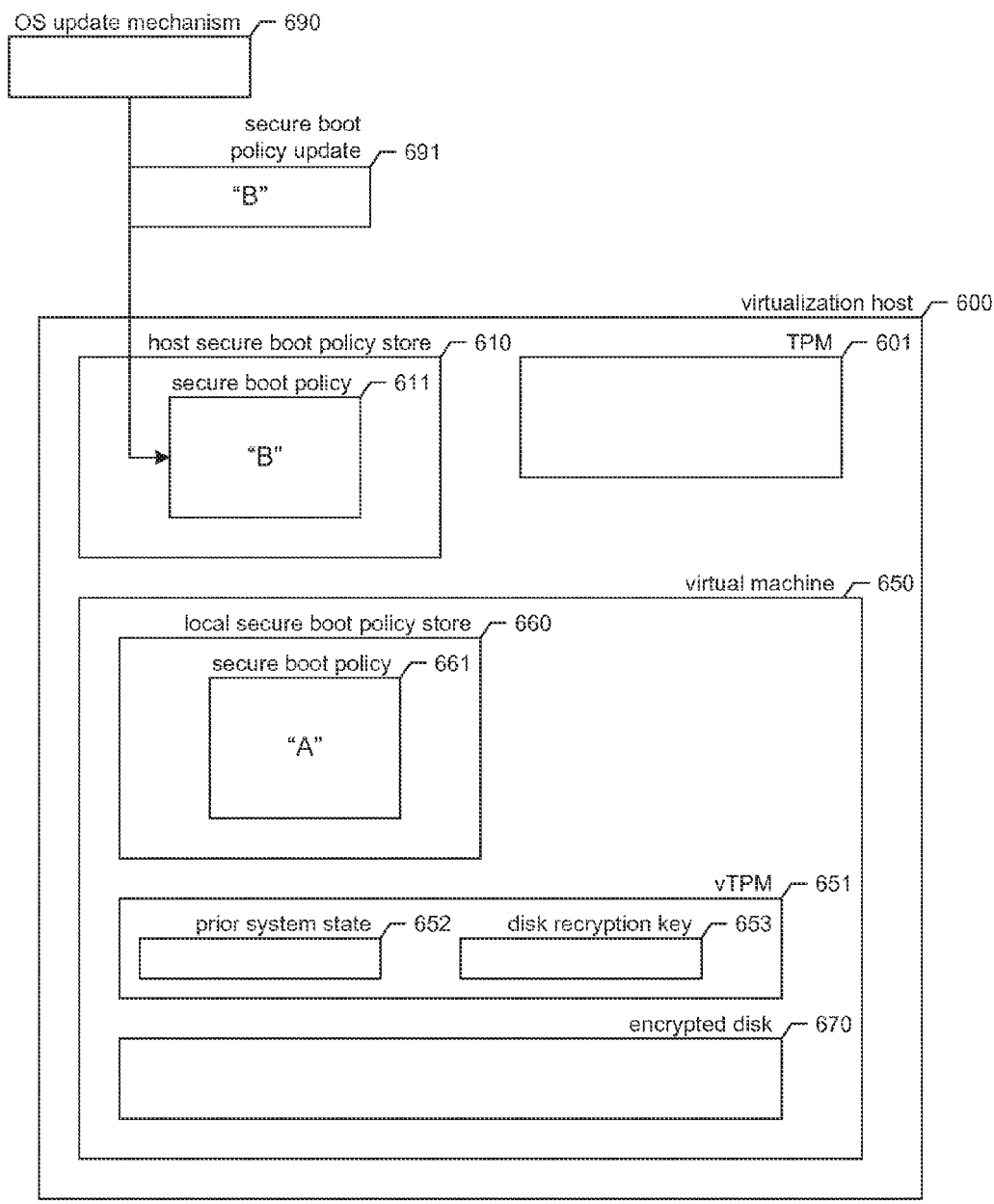
FIG. 6 is a block diagram showing a third state of the virtualization host at a time following performance of the acts shown in FIG. 5.

FIG. 6 is a block diagram showing a third state of the virtualization host at a time following performance of the acts shown in FIG. 5. FIG. 6 shows an operating system update mechanism 690 delivering a secure boot policy update 691 to the virtualization host. For example, secure boot policy update may add a new operating system version that is to be allowed to boot, and may delete a formerly approved signing key or certificate that has been found to have been used to sign malware or other unwanted code. It can be seen by the letter "B" shown in secure boot policy update 691 that the update specifies changes to the secure boot policy 461 shown in FIG. 4. It can be seen that the facility has updated secure boot policy 611 stored in host secure boot policy store 610 in accordance with the secure boot policy update 691, by the presence of the letter "B" in secure boot policy 611. It should be noted that, at this point, the facility has applied the update to secure boot policy 611 stored in host secure boot policy store 610, but has not applied the update to secure boot policy 661 stored in local secure boot policy store 660.

Figure 7:
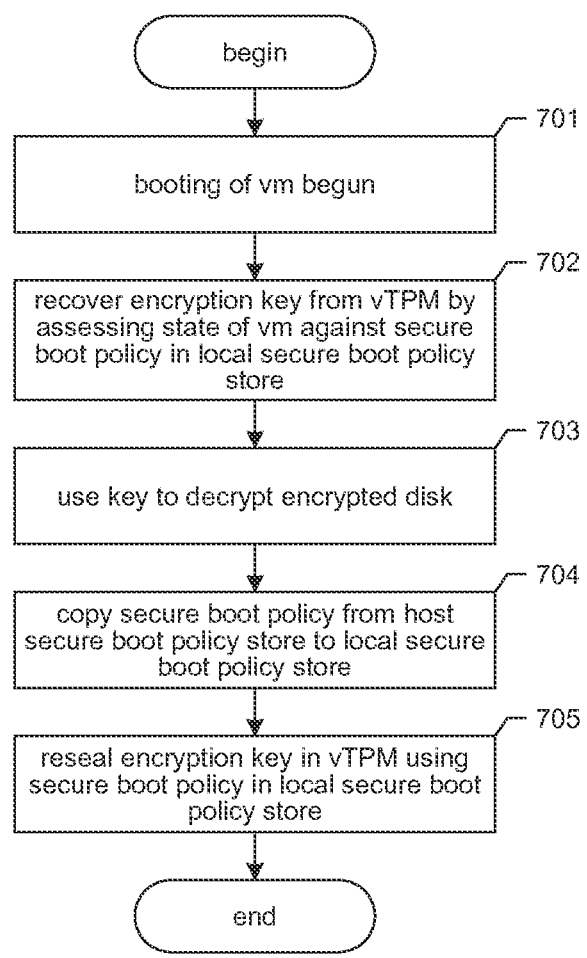
FIG. 7 is a flow diagram showing example acts that may be performed by the facility in some embodiments to handle booting of the virtual machine.

FIG. 7 is a flow diagram showing example acts that may be performed by the facility in some embodiments to handle booting of the virtual machine. At 701, booting of the virtual machine is initiated. At 702, the facility recovers the encryption key from the vTPM by, as part of the secure boot process, assessing the current state of the virtual machine against the prior system state stored in the vTPM, as well as against the secure boot policy stored in the local secure boot policy store. Because the secure boot policy stored in the local secure boot policy store has not been updated from the state 461 it was in FIG. 4 when the encryption key was sealed into the vTPM, the secure boot process proceeds successfully to permit recovery of the key from the vTPM. At 703, the facility uses the key to decrypt the encrypted disk as needed. At 704, the facility copies the secure boot policy stored in the host secure boot policy store to the local secure boot policy store, replacing the secure boot policy formerly stored there. Note that, at this point, the secure boot policy update recently received has now been applied to the virtual machine, which will enjoy the benefits provided by the update going forward. At 705, the facility reseals the encryption key in the vTPM using the current state of the virtual machine, together with the secure boot policy stored in the local secure boot policy store. As a result of the resealing, when the virtual machine is again rebooted, it will be possible to recover the key from the vTPM based upon the updated secure boot policy now stored in the local secure boot policy store. These acts then conclude.

Figure 8:
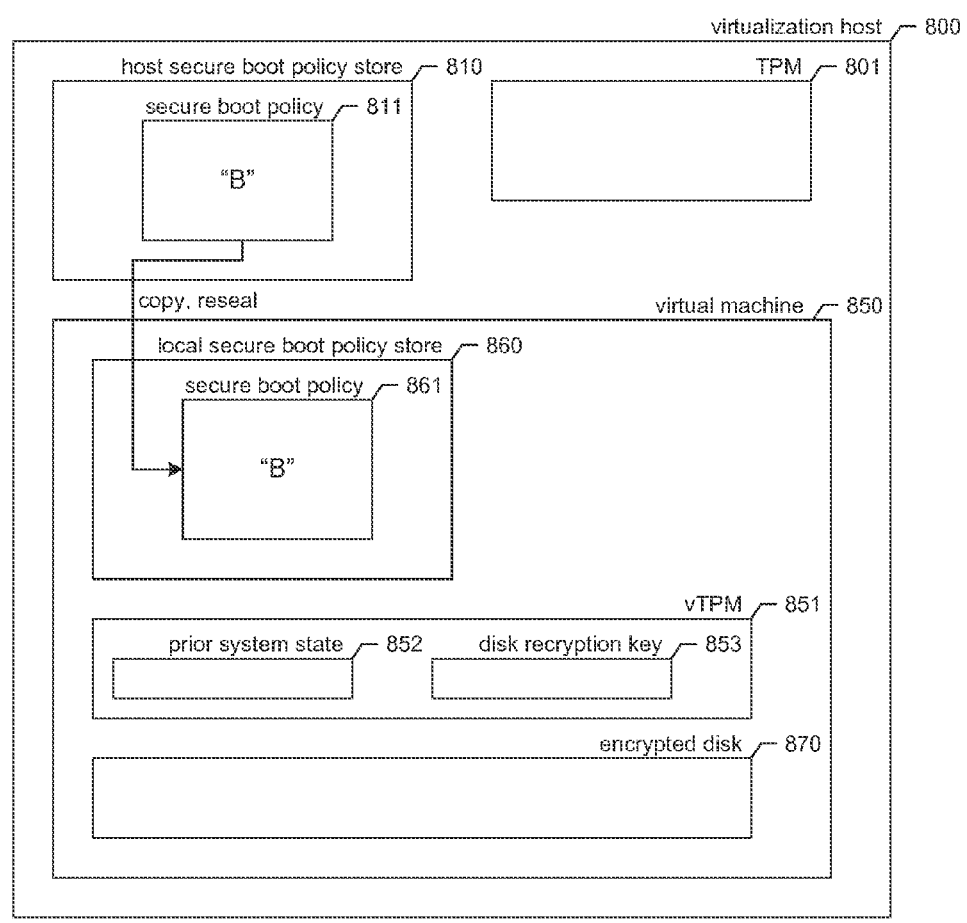
FIG. 8 is a block diagram showing a fourth state of the virtualization host corresponding to a time following performance of the acts shown in FIG. 7.

FIG. 8 is a block diagram showing a fourth state of the virtualization host corresponding to a time following performance of the acts shown in FIG. 7. It can be seen by the presence of the letter "B" in the secure boot policy 861 stored in the local secure boot policy store 860 that the updated secure boot policy 811 has been copied from the host secure boot policy store 810 to the local secure boot policy store 860. Further, the key 853 has been resealed in the vTPM using the current system state and the updated secure boot policy.

Figure 9:
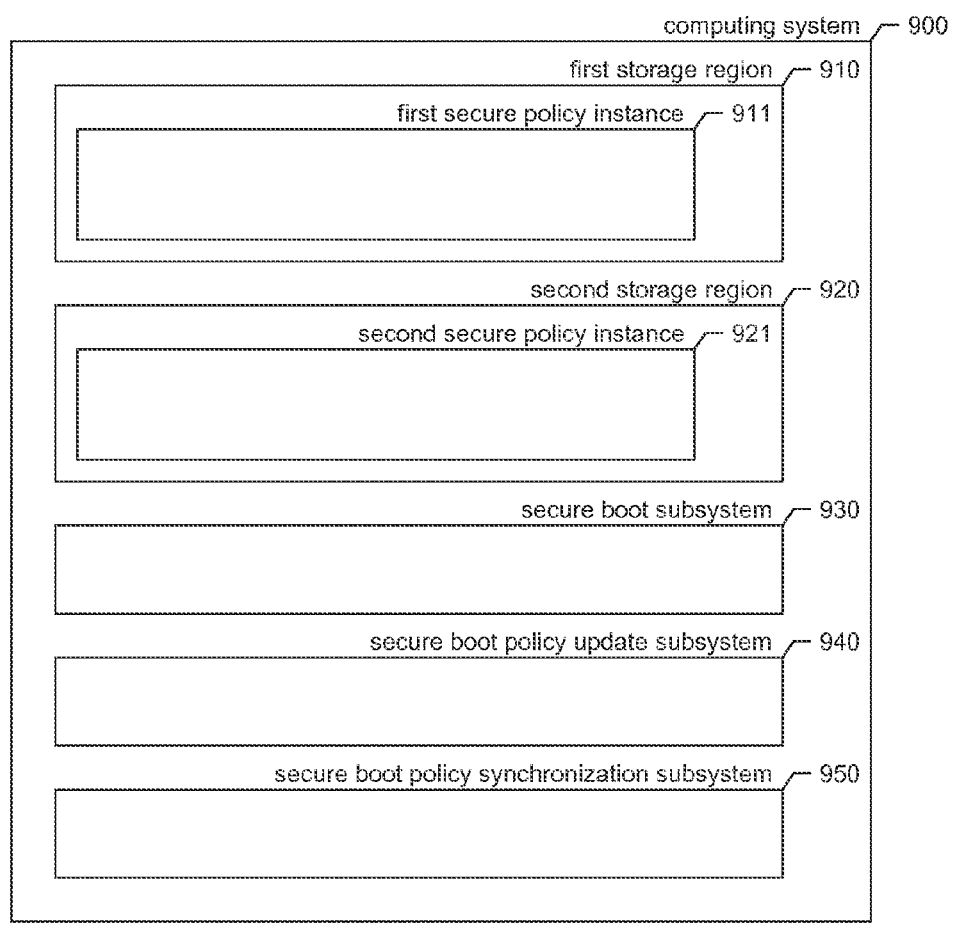
FIG. 9 is a block diagram showing some of the components that may be incorporated in at least some of the computer systems and other devices on which the facility operates.

FIG. 9 is a block diagram showing some of the components that may be incorporated in at least some of the computer systems and other devices on which the facility operates. The computing system 900 includes a first storage region 910 configured to store a first secure boot policy instance 911. The computing system also includes a second storage region 920 configured to store a second secure boot policy instance 921. The computing system further includes a secure boot subsystem 930. The secure boot subsystem is configured to subject a virtual machine to a secure boot process using the second secure boot policy instance stored by the second storage region. The computing system also includes a secure boot policy update subsystem 940. The secure boot policy update subsystem is configured to apply to the first secure boot policy instance stored by the first storage region secure boot policy updates that are received. The computing system further includes a secure boot policy synchronization subsystem 950. The secure boot policy synchronization subsystem is configured to selectively replace the second secure boot policy instance stored by the second storage region with the first secure boot policy instance stored by the first storage region In some examples, the facility provides a computing system for operating a virtual machine, comprising: a first storage region configured to store a first secure boot policy instance; a second storage region configured to store a second secure boot policy instance; a secure boot subsystem configured to subject the virtual machine to a secure boot process using the second secure boot policy instance stored by the second storage region; a secure boot policy update subsystem configured to apply to the first secure boot policy instance stored by the first storage region received secure boot policy updates; and a secure boot policy synchronization subsystem configured to selectively replace the second secure boot policy instance stored by the second storage region with the first secure boot policy instance stored by the first storage region.

In some examples, the facility provides a computer-readable medium having contents configured to cause a computing system to, in order to boot a virtual machine hosted on a host: boot the virtual machine in accordance with a policy instance associated with the virtual machine; as part of the booting, extract information needed to complete the booting from a virtual trusted platform module associated with the virtual machine, the extraction based upon the policy instance associated with the virtual machine; and at the completion of the booting, copy contents of a policy instance associated with the host into the policy instance associated with the virtual machine.

In some examples, the facility provides a method for booting a virtual machine hosted on a host, the method comprising: booting the virtual machine in accordance with a policy instance associated with the virtual machine; as part of the booting, extracting information needed to complete the booting from a virtual trusted platform module associated with the virtual machine, the extraction based upon the policy instance associated with the virtual machine; and, at the completion of the booting, copying contents of a policy instance associated with the host into the policy instance associated with the virtual machine.

In some examples, the facility provides a computer-readable medium storing a first secure boot policy data structure on behalf of a first virtual machine operating on a host, the first secure boot policy data structure comprising: policy directions for booting an operating system, the contents of the first secure boot policy data structure be usable in recovering information sealed in a virtual trusted platform module associated with the first virtual machine.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. A physical host computer for operating a virtual machine, comprising:
   a first secure storage region storing a first secure boot policy instance associated with the physical host computer;
   a second secure storage region storing a second secure boot policy instance associated with the virtual machine, wherein the second storage region is in a local storage region of the virtual machine;
   a secure boot subsystem subjecting the virtual machine to a secure boot process using the second secure boot policy instance stored by the second storage region;
   a secure boot policy update subsystem applying to the first secure boot policy instance stored by the first secure storage region received secure boot policy updates; and
   a secure boot policy synchronization subsystem selectively replacing the second secure boot policy instance stored by the second storage region with a copy of the first secure boot policy instance stored by the first secure storage region, wherein a virtual trusted platform module associated with the virtual machine is configured to cause suspension of a selected instance of the secure boot process;
   a disk encryption subsystem establishing an encryption key for encrypting an encrypted disk in the virtual machine; and
   an encryption key sealing subsystem sealing the encryption key in a virtual trusted platform module associated with the virtual machine using the second secure boot policy instance.

2. The physical host computer of claim 1, wherein the virtual trusted platform module causes suspension of a selected instance of the secure boot process when selected information including the contents of the second storage region differ to at least a threshold degree between the selected instance of the secure boot process and an instance of the process immediately preceding the selected instance of the secure boot process.

3. The physical host computer of claim 1, further comprising:
   a third storage region storing a third secure boot policy instance;
   a second secure boot subsystem subjecting a second virtual machine to a secure boot process using the third secure boot policy instance stored by the third storage region, wherein the secure boot policy synchronization subsystem selectively replaces the third secure boot policy instance stored by the third storage region with the first secure boot policy instance stored by the first storage region.

4. The physical host computer of claim 1 wherein the secure boot policy synchronization system replaces the second secure boot policy instance stored by the second storage region with the first secure boot policy instance stored by the first storage region in response to completion of the secure boot process.

5. The physical host computer of claim 1, further comprising:
   a virtual trusted platform module associated with the virtual machine; and
   a resealing subsystem that, in response to replacement by the secure boot policy synchronization subsystem, reseals within the virtual trusted platform module information needed for the secure boot process based upon the secure boot policy instance stored in the second storage region by the replacement.

6. A computer-readable memory or storage device storing instructions for execution on a computing system to perform operations for booting a virtual machine hosted on a host, the operations comprising:
   booting the virtual machine in accordance with a policy instance associated with the virtual machine, wherein the policy instance is stored in a local storage region of the virtual machine;
   as part of the booting, extracting information needed to complete the booting from a virtual trusted platform module associated with the virtual machine, the extraction based upon the policy instance associated with the virtual machine; and
   at the completion of the booting, copying contents of a policy instance associated with the host into the policy instance associated with the virtual machine;
   establishing an encryption key for encrypting an encrypted disk in the virtual machine; and
   sealing the encryption key in a virtual trusted platform module associated with the virtual machine using the policy instance associated with the virtual machine.

7. The computer-readable memory or storage device of claim 6 wherein the operations further comprise:
   in response to the copying, resealing the information within the virtual trusted platform based upon the policy instance associated with the virtual machine.

8. The computer-readable memory or storage device of claim 6 wherein the information is a disk encryption key, wherein the operations further comprise:
   decrypting portions of data associated with the virtual machine using the extracted disk encryption key.

9. The computer-readable memory or storage device of claim 8 wherein the decrypted portions of data are data within a virtual disk.

10. The computer-readable memory or storage device of claim 6 wherein the operations further comprise:
    receiving a policy update; and
    in response to receiving the policy update, applying the policy update to the policy instance associated with the host.

11. A method for operating a virtual machine on a physical host computer, the method comprising:
    storing a first secure boot policy instance associated with the physical host computer in a host secure boot policy store,
    storing a second secure boot policy instance associated with the virtual machine in a local storage region of the virtual machine;
    subjecting the virtual machine to a secure boot process using the second secure boot policy instance;
    applying to the first secure boot policy instance stored by the first secure storage region received secure boot policy updates;
    selectively replacing the second secure boot policy instance stored by the local storage region of the virtual machine with a copy of the first secure boot policy instance stored by the first storage region;
    establishing an encryption key for encrypting an encrypted disk in the virtual machine; and
    sealing the encryption key in a virtual trusted platform module associated with the virtual machine using the second secure boot policy.

12. The method of claim 11 wherein the first secure boot policy instance differs from a separate second secure boot policy instance stored on behalf of a second virtual machine operating on the host.

13. The method of claim 11 wherein the first secure boot policy instance differs from a separate second secure boot policy instance stored on behalf of the host.

14. The method of claim 11 wherein the first secure boot policy instance was copied from a separate second secure boot policy instance stored on behalf of the host at a time when an operating system was fully booted on the first virtual machine.

15. The method of claim 11, further comprising storing encrypted virtual disk contents, wherein the first secure boot policy instance is usable in recovering a key usable to decrypt encrypted virtual disk contents sealed in the virtual trusted platform module.

* * * * *